(12) United States Patent
Kim

(10) Patent No.: US 6,305,021 B1
(45) Date of Patent: Oct. 16, 2001

(54) ANALOG/DIGITAL CABLE TV CAPABLE OF PERFORMING BIDIRECTIONAL COMMUNICATION

(75) Inventor: Soo-Won Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/042,111

(22) Filed: Mar. 9, 1998

(30) Foreign Application Priority Data

Mar. 7, 1997 (KR) .................................................... 97-4012

(51) Int. Cl.$^7$ .................................................... H04N 7/173
(52) U.S. Cl. ............................................ 725/131; 348/554
(58) Field of Search .................................. 348/10, 7, 12, 348/13, 553, 554, 555, 426, 705, 706, 726; 455/5.1, 6.1, 6.2, 6.3; 375/316; 725/100, 131, 139, 151

(56) References Cited

U.S. PATENT DOCUMENTS

| | | | |
|---|---|---|---|
| 5,638,112 | * | 6/1997 | Bestler et al. .......................... 348/10 |
| 5,774,195 | * | 6/1998 | Miyahara et al. .................... 348/726 |
| 5,826,166 | * | 10/1998 | Brooks et al. ........................ 455/5.1 |
| 5,898,463 | * | 4/1999 | Nishiyama ............................ 348/554 |
| 5,982,411 | * | 11/1999 | Eyer et al. ................................ 348/6 |
| 6,014,178 | * | 1/2000 | Jeon et al. ............................ 348/554 |

\* cited by examiner

Primary Examiner—Chris Grant
(74) Attorney, Agent, or Firm—Sughrue, Mion, Zinn, Macpeak & Seas, PLLC

(57) ABSTRACT

An analog/digital cable TV (CATV) includes an analog broadcast signal processor for receiving only a signal of a particular channel selected by a user and restoring an analog video signal and an analog audio signal contained in the received analog signal. Also, the CATV includes a digital broadcast signal processor for NTSC-encoding and audio-digital-to-analog-converting the received digital video and audio signals contained in the digital broadcast signal received via a phone jack to then be output to an output signal selector, and outputting the upstream signal via the phone jack connected with a CATV broadcast station. The output signal selector selectively applies the signals output from the digital and analog broadcast signal processors to a monitor. The monitor video-displays and audio-outputs the video and audio data contained in the signal received from the output signal selector. A controller controls the operations of the analog broadcast signal processor, the digital broadcast signal processor and output signal selector.

12 Claims, 4 Drawing Sheets

ANALOG/DIGITAL CABLE TV CAPABLE OF PERFORMING BIDIRECTIONAL COMMUNICATION

BACKGROUND OF THE INVENTION

The present invention relates to a cable TV (CATV) for video-displaying and audio-outputting broadcast signals received from a respective CATV broadcast station, and more particularly, to a CATV for video-displaying and audio-outputting analog broadcast signals and digital broadcast signals received from CATV broadcast stations.

CATVs are operative to video-display and audio-output broadcast signals that have been transmitted from CATV broadcast stations. CATV systems originated as a supplement to community antenna television systems and served to distribute an aerial signal received via a master antenna to poor reception areas. In the past conventional CATVs included equipment for receiving and demodulating only signals modulated in analog form since CATV broadcast stations for providing aerial broadcasts and independent programs typically supplied only analog signals according to the NTSC standard. Recently CATV broadcast stations have begun to provide broadcast programs transmitted in the form of digital broadcast signals for providing moving pictures of high quality and stable transmission of the broadcast signals, and a variety of services using bidirectional communications to users.

However, since such a conventional CATV processes only analog broadcast signals, the users must purchase an additional digital broadcast signal processing apparatus capable of performing a bidirectional communication and an apparatus which interfaces the digital broadcast signal processing apparatus with the conventional analog CATV, in order to receive the digital broadcast programs supplied recently from CATV broadcast stations and the bidirectional communication service.

SUMMARY OF THE INVENTION

To solve the above problems, it is an object of the present invention to provide an analog/digital CATV capable of performing a bidirectional communication in which both an analog broadcast and a digital broadcast can be viewed with a single CATV.

To accomplish the above object of the present invention, there is provided a CATV for video-displaying and audio-outputting an analog broadcast signal and a digital broadcast signal which are received from a CATV broadcast station, the CATV comprising: an analog broadcast signal processor for receiving and amplifying only a signal of a particular channel selected by a user among the analog broadcast signal, and restoring a first video signal and a first audio signal contained in the received and amplified analog broadcast signal; a digital broadcast signal processor for decoding the received digital broadcast signal into digital video and audio signals, and digital-to-analog converting the decoded digital video and audio signals into the analog video and audio signals to generate second video and audio signals; a monitor for video-displaying and audio-outputting the first video and audio signals received from the analog broadcast signal processor and the second video and audio signals received from the digital broadcast signal processor; an output signal selector for selectively applying the first video and audio signals received from the analog broadcast signal processor and the second video and audio signals received from the digital broadcast signal processor to the monitor; a remote controller; and a controller for controlling the analog broadcast signal processor to receive only the signal of the particular channel according to the select channel of the user received from the remote controller, and controlling the operation of the output signal selector according to the analog/digital broadcast select received from the remote controller so that the first video and audio signals received from the analog broadcast signal processor and the second video and audio signals received from the digital broadcast signal processor are selectively applied to the monitor, wherein the controller generates an upstream signal according to the upstream data received from the remote controller and the digital broadcast signal processor transmits the upstream signal generated from the controller to the CATV broadcast signal.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described in detail with reference to the accompanying drawings.

Figure 1:
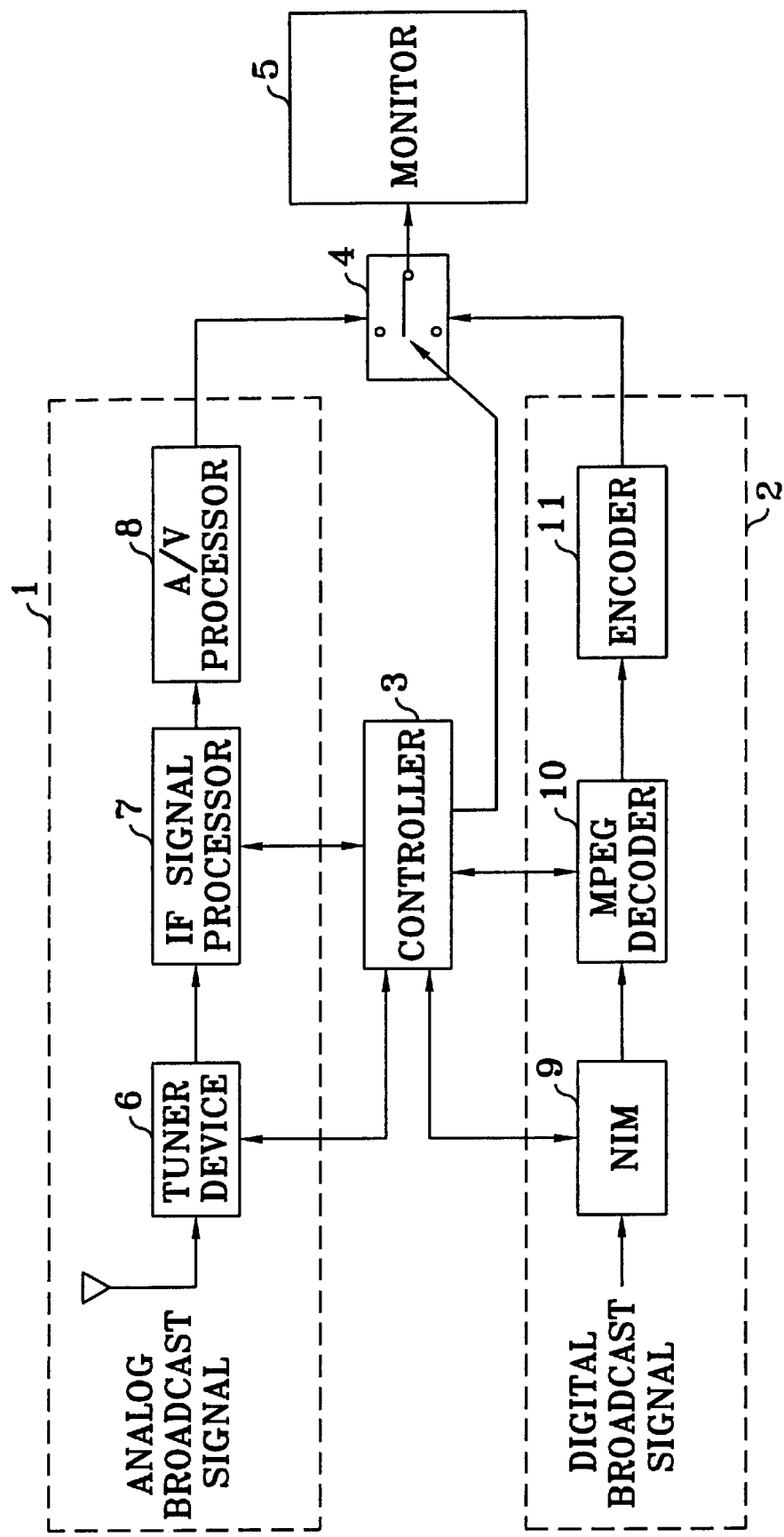
FIG. 1 is a schematic block diagram of an analog/digital CATV according to an embodiment of the present invention.

The analog-digital CATV of FIG. 1 includes an analog broadcast signal processor 1, a digital broadcast signal processor 2, an output signal selector 4, a monitor 5 and a controller 3. The analog broadcast signal processor 1 has a tuner device 6, an intermediate frequency (IF) signal processor 7, and an audio/video (A/V) processor 8. The analog processor 1 receives only the signals on a channel that is selected by a user among analog broadcast signals transmitted via a dedicated cable, and restores the signal of the received channel into a prior-to-being-modulated analog video and audio signals. The digital processor 1 then outputs the restored result to the output signal selector 4. The digital broadcast signal processor 2 receives a digital broadcast signal transmitted via a telephone cable and decodes the received digital broadcast signal into the prior-to-being-MPEG-encoded digital video and audio signals. The digital processor 2 then digital-to-analog-converts the decoded digital video and audio signals according to the NTSC-standard, and outputs the result to the output signal selector 4. Upstream data to be transmitted to a CATV broadcast station by a user is modulated into an upstream signal according to a QPSK (quadrature phase shift keying) modulation method and the modulation result is output to the CATV broadcast station. The output signal selector 4 applies the signal output from the digital broadcast signal processor 2 and the signal output from the analog broadcast signal processor 1 selectively to the monitor 5 according to a control signal output from the controller 3. The monitor 5 video-displays and audio-outputs the video data and audio data contained in the signal received from the output signal selector 4. A remote controller (not shown) receives commands for channel select and analog/digital broadcast select from the user and then transmits appropriate commands to the controller 3. The controller 3 controls the operations of the analog broadcast signal processor 1, the digital broadcast signal processor 2 and the output signal selector 4 according to the user commands received from the remote controller.

Hereinbelow, the analog broadcast signal processor 1 will be described in more detail with reference to FIG. 2.

Figure 2:
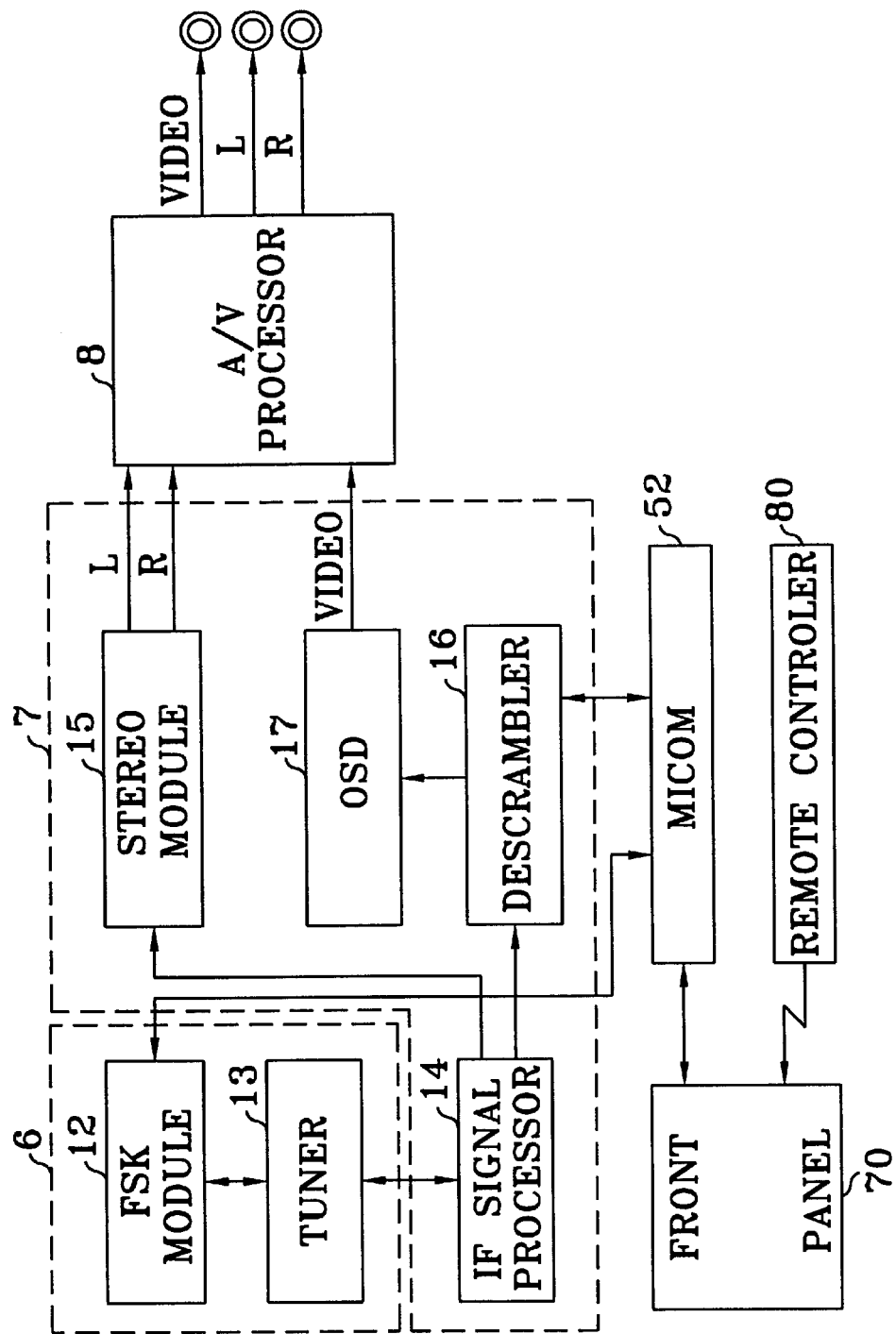
FIG. 2 is a detailed block diagram of a tuner and a signal processor in the analog broadcast signal processor of FIG. 1.

FIG. 2 is a detailed block diagram of a tuner 6 and a signal processor 7 in the analog broadcast signal processor of FIG. 1. The tuning device 6 includes a tuner 13 and a FSK module (frequency shift keying module) 12. The tuner 13 amplifies the signals of only a single channel selected by a user from among the analog broadcast signals. The FSK module 12 FSK-modulates the signal output from the tuner 13 and generates an intermediate frequency (IF) signal. The tuner 13 outputs the IF signal received from the FSK module 12 to an IF signal processor 14 in the signal processor 7. The IF signal processor 14 separates the IF signal from the tuner 13 into a video signal and an audio signal and outputs the separated video and audio signals to a descrambler 16 and a stereo module 15, respectively. The descrambler 16 descrambles the video signal received from the IF signal processor 14 according to a control signal of a microcomputer 52, and then outputs the result to an on-screen-display (OSD) 17. The OSD 17 mixes the video signal from the IF signal processor 14 with the OSD character to be displayed, to then output the result to an audio/video (A/V) processor 8. the stereo module 15 separates the audio signal received from the IF signal processor 14 into a left audio signal and a right audio signal, and then outputs the result to an audio/video (A/V) processor 8. The A/V processor 8 audio and video processes the left and right audio signals received from the stereo module 15 in the signal processor 7 and the video signal received from the OSD 17, and then outputs the result to the output signal selector 4. The remote controller 80 outputs an infrared signal according to a user input, for a front panel 70 of the CATV. The front panel 70 receives the infrared signal from the remote controller 80, transmits control signal according to the received infrared signal to the microcomputer 52, and displays the functions and commands selected by the user according to the control signal received from the microcomputer 80.

As seen in FIG. 1, the digital broadcast signal processor 2 includes a NIM (network interface module) device 9, an MPEG decoder device 10, and an encoder device 11. The NIM device 9 receives, amplifies and filters a downstream signal input via a telephone cable from a broadcast station, and then outputs the result to the MPEG decoder device 10. Also, digital broadcast signal processor 2 receives the upstream signal containing the data to be transmitted to the broadcast station from the controller 3 and outputs the received result via the telephone cable. For convenience of explanation, it is assumed that the downstream signal transmitted from the broadcast station is modulated according to 16CAP to (16 Carrierless Amplitude-modulation Phase-modulation) method, and the upstream signal transmitted to the broadcast station by the user is modulated according to the QPSK modulation method.

Hereinbelow, the digital broadcast signal processor 2 will be described in more detail with reference to FIGS. 3 and 4.

Figure 3:
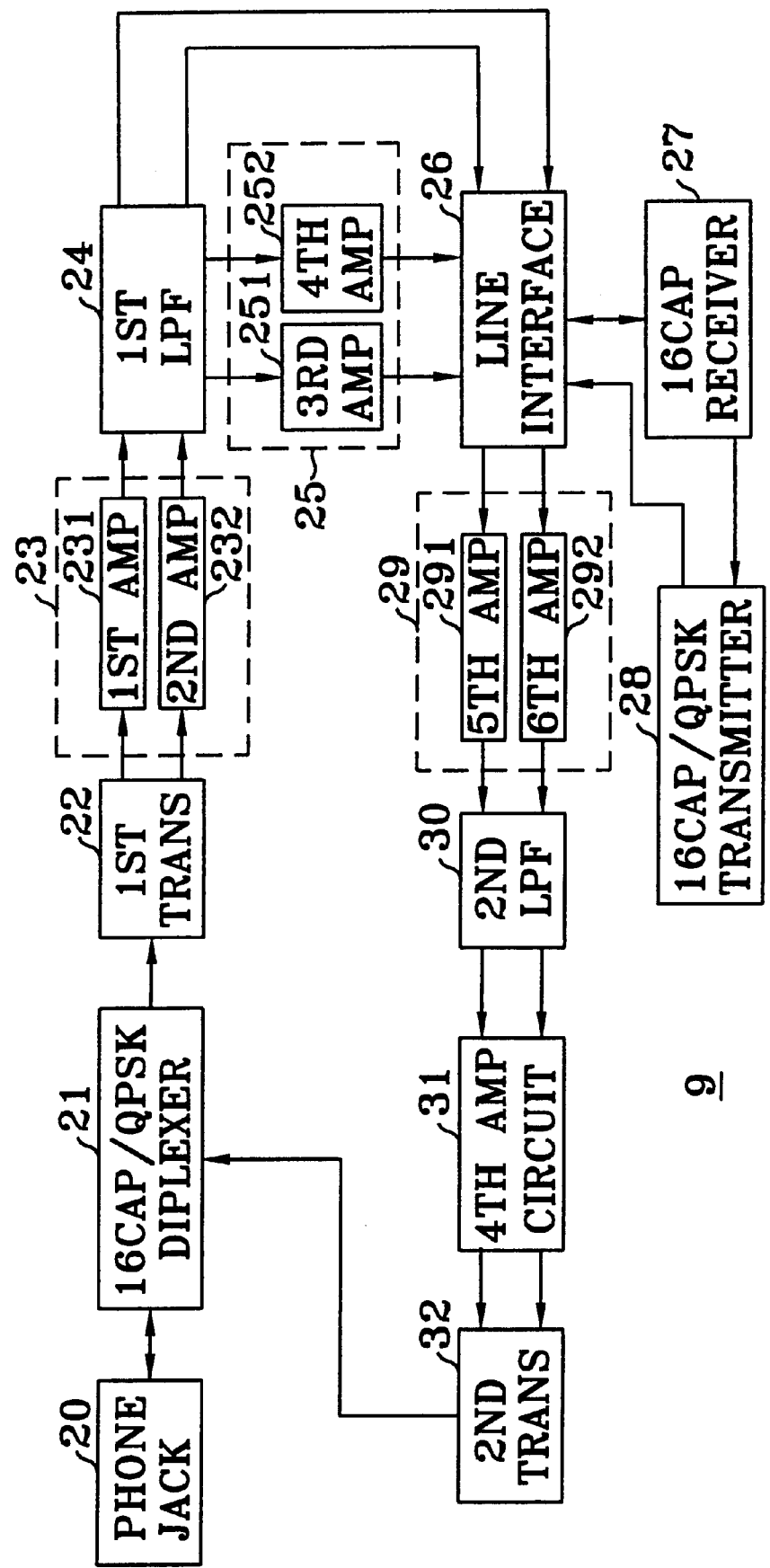
FIG. 3 is a detailed block diagram of a NIM in the digital broadcast signal processor of FIG. 1.

FIG. 3 is a detailed block diagram of the NIM device 9 in the digital broadcast signal processor 2 of FIG. 1. The downstream signal modulated according to the 16CAP method is input to a phone jack 20 via a telephone cable which is connected with a CATV broadcast station. A 16CAP/QPSK diplexer 21 is a device for frequency-isolating a transmit frequency band and a receive frequency band so that the upstream signal received from the phone jack 20 and the downstream signal received from the broadcast station are not interfered with each other. The 16CAP/QPSK diplexer 21 outputs the downstream signal of the transmit rate of 51.84 Mbit/sec received from the phone jack individually to a first transformer 22, while preventing it from being interfered with the upstream signal. The first transformer 22 matches the impedance of an unbalanced circuit and a balanced circuit, and transmits the downstream signals from the 16CAP/QPSK diplexer 21 to a first amplifier circuit 23 which is a balanced circuit, without having a reflected power. A first amplifier 231 and a second amplifier 232 in the first amplifier circuit 23 each amplify the downstream signals from the first transformer 22 by low gain. As a result, the downstream signals amplified to a level in the range of 150 mV is output from the first amplifier circuit 23 to a first low-pass-filter (LPF) 24. The first LPF 24 low-pass-filters the downstream signal received from the first amplifier circuit 23, and outputs the low-pass-filtered downstream signals to a second amplifier circuit 25 and a line interface 26. As a result, the downstream signals output from first LPF 24 become signals having a frequency band signal ranging from 6 MHz to 26 MHz. The second amplifier circuit 25 has a third amplifier 251 and a fourth amplifiers 252 which are connected in parallel with each other. The third and fourth amplifiers 251 and 252 in the second amplifier circuit 25 amplify the downstream signal received from the first LPF 24 by high gain, respectively. As a result, the downstream signal amplified to a level in the range of 1.4 V is output from the second amplifier circuit 25 to the line interface 26. The line interface 26 outputs the downstream signals received from the second amplifier circuit 25 and the first LPF 24 to a 16CAP receiver 27. The 16CAP receiver 27 converts the analog downstream signal received from the line interface 26 into a digital downstream signal and then outputs the result to a 16CAP/QPSK transmitter 28. The 16CAP/QPSK transmitter 28 outputs the downstream signal received from the 16CAP receiver 27 to a demultiplexer 41 according to a control signal of a central processing unit (CPU) 51. The demultiplexer 41 outputs the downstream signal received from the 16CAP/QPSK transmitter 28 to the MPEG decoder device 10. As a result, the downstream signal transmitted to the NIM 9 via the phone jack from the broadcast station is output to the MPEG decoder device 10.

Figure 4:
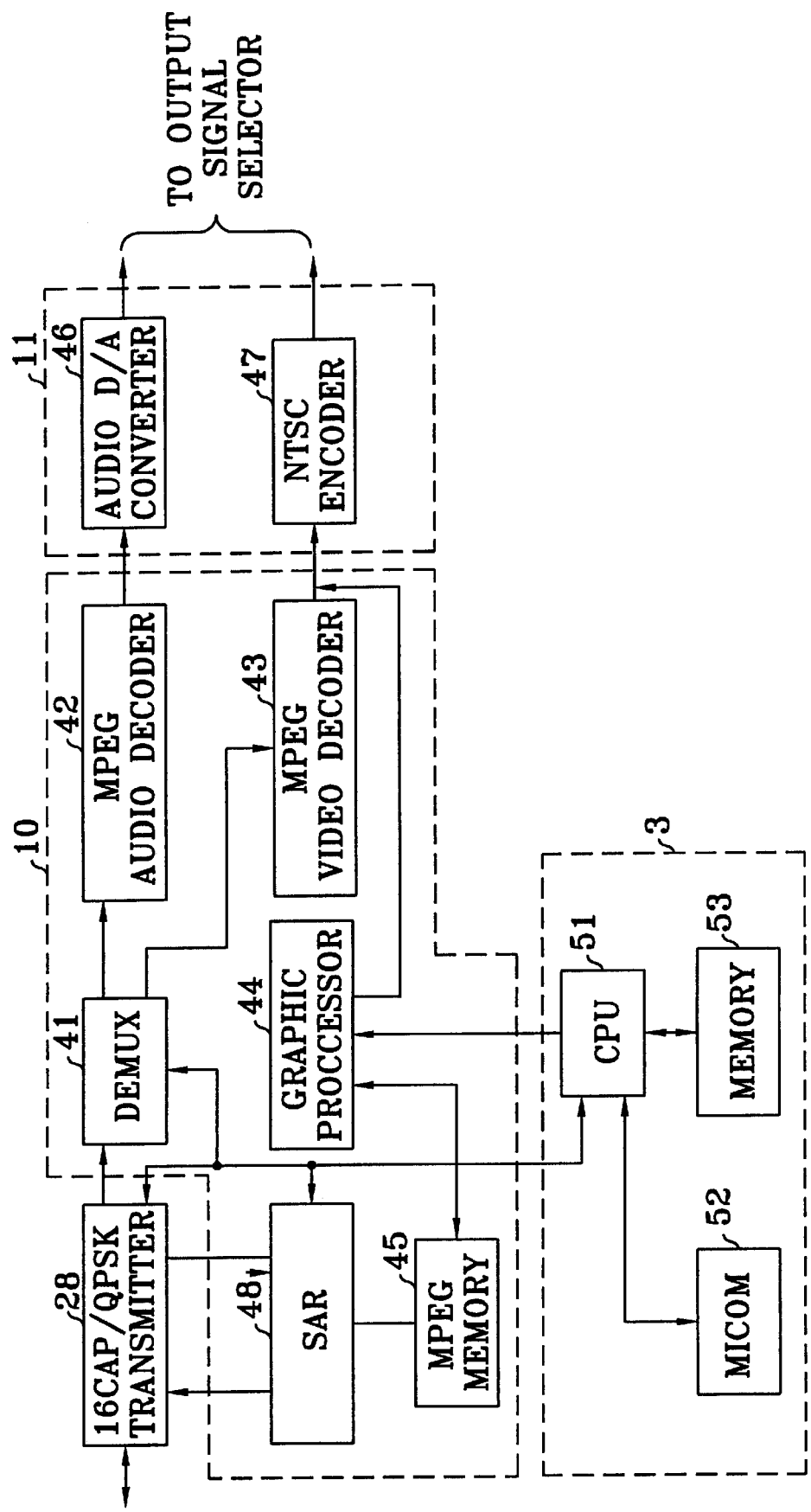
FIG. 4 is a detailed block diagram of an MPEG decoder and an encoder in the digital broadcast signal processor.

FIG. 4 shows a detailed block diagram of an MPEG decoder device 10 and an encoder device 11 in the digital broadcast signal processor 2. The 16CAP/QPSK transmitter 28 in the NIM device 9 outputs the MPEG data and the clock signal to the demultiplexer 41 and a SAR (segmentation and reassembly) 48 in the MPEG decoder device 10 among the downstream signals received from the 16CAP receiver 27. The demultiplexer 41 divides the MPEG data received from the 16CAP/QPSK transmitter 28 into MPEG video data and MPEG audio data according to a control signal of the CPU 51 applied via a bus, and outputs the MPEG video and audio data to an MPEG video decoder 43 and an MPEG audio decoder 42. respectively. The SAR 48 performs segmentation and reassembly of data so that the serially transmitted downstream signal from the 16CAP/QPSK transmitter 28 is input to the CPU 51 in parallel. The MPEG audio decoder 42 decodes the MPEG audio data from the demultiplexer 41 into the prior-to-being-MPEG-encoded audio signal and then outputs the result to an audio digital/analog (D/A) converter 46 in the encoder device 11. The audio D/A converter 46 converts the audio signal decoded from the MPEG audio decoder 42 in analog form, and outputs the analog audio signal to the output signal selector 4. The MPEG video decoder 43 decodes the MPEG video data from the demultiplexer 41 into the prior-to-being-MPEG-encoded video signal and then outputs the result to an NTSC encoder 47 in the encoder device 11. A graphic processor 44 generates OSD character data under the control of the CPU 51 and outputs the generated OSD character data to the NTSC encoder 47 in the encoder device 11. An MPEG memory 45 is a device for storing temporary data created during generating of the OSD character data by of the graphic processor 44. The NTSC encoder 47 mixes the video signal from the MPEG video decoder 43 with the OSD character data from the graphic processor 44 and then encodes the mixed video signal according to the encoding method of the NTSC standard, to then output the encoded video signal to the output signal selector 4. Here, the audio and video signals output from the audio D/A converter 46 and the NTSC encoder 47 are the same analog audio and video signals as those output from the analog broadcast signal processor 1 to the output signal selector 4, as seen in FIG. 1.

The microcomputer 52 in the controller 3 receives the information to be transmitted to the CATV broadcast station by the user using the remote controller (not shown) and transmits the received information to the CPU 51. The CPU 51 generates user data based on the user input information transmitted from the microcomputer 52 and then transmits the user data to the SAR 48. Here, a method for transmitting the user data in the CPU 51 is a parallel transmission method. Hereinbelow, for convenience of explanation, the user data to be transmitted to the CATV broadcast station is called an upstream signal. The SAR 48 performs segmentation and reassembly of the upstream signal so that the upstream signal transmitted in parallel from the CPU 51 is arranged in serial, and then transmits the result to the 16CAP/QPSK transmitter 28. The NIM 9 of FIG. 3 receives the upstream signal transmitted in the form of serial via the SAR 48 data from the controller 3 and outputs the received upstream signal to the CATV broadcast station. Here, a process about how the NIM 9 transmits the upstream signal received from the controller 3 to the CATV broadcast station will be described below, with reference to the remaining blocks of FIG. 3.

The 16CAP/QPSK transmitter 28 of FIG. 3 receives the upstream signals transmitted in serial via the SAR 48 data form from the controller 3 and outputs the upstream signals to the line interface 26 according to the control signals from the CPU 51. The line interface 26 outputs the upstream signals received from the 16CAP/QPSK transmitter 28 to a third amplifier circuit 29 where a fifth amplifier 291 and a sixth amplifier 292 are connected in parallel with each other. The fifth and sixth amplifiers 291 and 292 in the third amplifier circuit 29 amplify the upstream signals received from the line interface 26 by a predetermined voltage level, and then output the result to a second LPF 30. The second LPF 30 low-pass-filters the amplified result output from the third amplifier circuit 29, so that the upstream signal output to a fourth amplifier 31 becomes a frequency band signal within a range from 28 MHz to 30 MHz. The fourth amplifier 31 is a kind of a video line driver, and amplifies the upstream signal input from the second LPF 30 and then the outputs the amplified result to a second transformer 32. The second transformer 32 transmits the upstream signal received from the fourth amplifier 31 which is a balanced circuit, to a 16CAP/QPSK diplexer 21, which is an unbalanced circuit that reflects power. The 16CAP/QPSK diplexer 21 outputs the upstream signal modulated in the QPSK method of a transmit rate of 1.62 Mbit/sec to a telephone cable and an input phone jack without having a mutual interference. As a result, the user data input via a remote controller is transmitted to a CATV broadcast station through a telephone cable.

As described above, the analog/digital CATV according to the present invention can process an analog broadcast signal transmitted via a dedicated cable from a CATV broadcast station and a digital broadcast signal transmitted via a telephone cable from the CATV broadcast station, so that they are output as a video output and an audio output, using an analog broadcast signal processor 1 and a digital broadcast signal processor 2 following the control of a controller 3, and can output the signals to an output signal selector 4. The output signal selector 4 applies the signals output from the analog broadcast signal processor 1 and the digital broadcast signal processor 2 selectively to a monitor 5. The digital broadcast signal processor 2 also performs functions of modulating the user data to be transmitted into an upstream signal following the QPSK modulation method and transmitting the modulation result to a CATV broadcast station.

Thus, since the analog/digital CATV according to the present invention can be compatible with an analog broadcast and a digital broadcast provided by a CATV broadcast station, a user does not need to purchase additional devices for viewing a digital broadcast. Also, since the present invention can perform a bidirectional communication, a variety of services can be provided to the user.

While only certain embodiments of the invention have been specifically described herein, it will apparent that numerous modifications may be made thereto without departing from the spirit and scope of the invention.

What is claimed is:

1. An analog/digital cable TV (CATV) for video-displaying and audio-outputting an analog broadcast signal and a digital broadcast signal which are received from a CATV broadcast station, the analog/digital CATV comprising:

an analog broadcast signal processor for receiving and amplifying only a signal of a particular channel selected by a user from among a plurality of analog signal channels within the analog broadcast signal, and restoring a first video signal and a first audio signal contained in the received and amplified analog broadcast signal;

a digital broadcast signal processor for decoding the received digital broadcast signal into digital video and audio signals, and digital-to-analog converting the decoded digital video and audio signals into the analog video and audio signals to generate second video and audio signals;

a monitor for video-displaying and audio-outputting the first video and audio signals received from the analog broadcast signal processor and the second video and audio signals received from the digital broadcast signal processor;

an output signal selector for selectively applying the first video and audio signals received from the analog broadcast signal processor and the second video and audio signals received from the digital broadcast signal processor to the monitor;

a remote controller; and a controller for controlling the analog broadcast signal processor to receive only the signal of said particular channel according to a user's channel selection information received from said remote controller, and controlling the operation of the output signal selector according to the user-selected analog/digital broadcast selection information received from the remote controller so that the first video and audio signals received from the analog broadcast signal processor and the second video and audio signals received from the digital broadcast signal processor are selectively applied to the monitor.

2. The analog/digital CATV according to claim 1, wherein said controller generates an upstream signal according to a user command received from said remote controller, and wherein said digital broadcast signal processor comprises:

a network interface module (NIM) portion for amplifying and low-pass-filtering the upstream signal received from said controller, outputting the result to the CATV broadcast station and amplifying and low-pass-filtering the digital broadcast signal received from said CATV broadcast station;

an MPEG decoder device for receiving the amplified and low-pass-filtered digital broadcast signal from said NIM, separating the received digital broadcast signal into the digital audio and video signals, and decompressing and decoding the digital audio and video signals; and an encoder device for receiving the decoded digital audio and video signals from said MPEG decoder device and digital-to-analog-converting the received signals into analog form to thereby generate the second audio and video signals, respectively, said second audio and video signals obtained after being digital-to-analog-converted by said encoder device become analog signals comparable to the first audio and video signals.

3. The analog/digital CATV according to claim 2, wherein the upstream signal output from said NIM is a signal which has been modulated according to the QPSK modulation method.

4. The analog/digital CATV according to claim 1, wherein said analog broadcast signal processor comprises:

a tuner device for selection, by the user, of the signal of the particular channel from among the plurality of analog signal channels within the analog broadcast signal, and for frequency-shift-keying the analog signal of said particular channel and generating an intermediate frequency (IF) signal;

an IF signal processor for dividing the IF signal received from said tuner device into analog audio and video signals, separating the analog audio signal into the left and right audio signals and descrambling the analog video signal;

an audio/video (A/V) processor for decoding the left and right audio signal received from said IF signal processor and the descrambled video signal and generating the first audio and video signals.

5. The analog/digital CATV according to claim 1, wherein said monitor video-displays and audio-outputs the video and audio signals according to the NTSC standard.

6. The analog/digital CATV according to claim 1, wherein the first video and audio signals received from the analog broadcast signal processor and the second video and audio signals received from the digital broadcast signal processor are substantially processed signals inputted to the output signal selector and ready to be video-displayed and audio-outputted by the monitor.

7. A method of selectively video displaying and audio outputting an analog broadcast signal having a plurality of channels and a digital broadcast signal, both of which are locally received from a CATV broadcast station, comprising:

remotely identifying, via a remote control, a particular one of a plurality of channels from among those in the analog broadcast signal;

remotely identifying with analog/digital selection information, via a remote control, whether said analog broadcast or said digital broadcast signals are to be received;

locally receiving and processing only a signal of said particular channel and restoring a first video signal and a first audio signal contained in said received analog broadcast signal;

locally receiving and decoding a digital broadcast signal into a second video and a second audio signal;

generating a user-selected signal via said remote control;

selecting, after at least one of said locally reviewing and processing step and said locally receiving and decoding step, one of said first video and audio or said second video and audio signals in response to a remote, user selected signal;

video-displaying and audio-outputting with a monitor said selected one of a first video and audio signal and a second video and audio signal.

8. The method of claim 7 further comprising:

locally generating an upstream signal and transmitting said signal to said CATV broadcast station.

9. The method of claim 7 further comprising:

receiving said digital signal via a telephone line.

10. The method of claim 7 wherein said selecting step comprises switching between said first video and audio signals and said second audio and video signals.

11. The method of claim 7 wherein said selecting step further comprises selectively controlling one of an IF signal processing of said received analog broadcast channel and an MPEG decoder for said digital broadcast signal.

12. The method of claim 7, wherein the first video and audio signals and the second video and audio signals are substantially processed, and ready to be video-displayed and audio-outputted by the monitor, before the selecting step occurs.

* * * * *